United States Patent
Artzner et al.

Patent Number: 5,987,984
Date of Patent: Nov. 23, 1999

[54] DEVICE FOR DETERMINING A MOTION PARAMETER WITH AUTOMATIC SCALING FACTOR CORRECTION

[75] Inventors: Johannes Artzner, Reutlingen; Wolfram Bauer, Tuebingen, both of Germany

[73] Assignee: Robert Bosch GmbH, Germany

[21] Appl. No.: 09/038,776

[22] Filed: Mar. 11, 1998

[30] Foreign Application Priority Data

Mar. 13, 1997 [DE] Germany ............... 197 10 359

[51] Int. Cl.$^6$ .................................... G01P 9/04
[52] U.S. Cl. .................................. 73/497; 73/504.13
[58] Field of Search ............... 73/1.37, 1.88, 73/497, 504.12, 504.13, 504.14, 504.15, 504.16

[56] References Cited

U.S. PATENT DOCUMENTS

| | | | |
|---|---|---|---|
| 5,540,094 | 7/1996 | Varnham et al. | 73/1.37 |
| 5,806,364 | 9/1998 | Kato et al. | 73/504.12 |

FOREIGN PATENT DOCUMENTS 44 47 005   7/1996   Germany.

Primary Examiner—John E. Chapman
Attorney, Agent, or Firm—Kenyon & Kenyon

[57] ABSTRACT

A device which determines a motion parameter with a sensor having a plurality of sensor elements coupled to one another, in which the motion parameter corresponds to a rotational speed. The device includes a starter loop for putting the sensor in a state of excitation via a starter signal via at least one of the sensor elements and for generating a sensor quantity, with the sensor quantity being a measure of a response of the sensor to the starter signal, and the starter signal having a substantially constant amplitude. A detector loop coupled to at least one of the sensor elements is also provided in the device for providing a measurement signal correlating with the motion parameter. The device further includes an analysis unit for providing an output voltage representing the motion parameter as a function of the measurement signal, a correction unit for keeping a substantially constant correlation between the output voltage and the motion parameter and for generating a correction signal as a function of the sensor quantity, and a multiplier providing the correction signal to the analysis unit.

9 Claims, 1 Drawing Sheet

DEVICE FOR DETERMINING A MOTION PARAMETER WITH AUTOMATIC SCALING FACTOR CORRECTION

BACKGROUND INFORMATION

German Patent No. DE 44 47 005 describes a device for determining a rotational speed, with a sensor being set in a constant state of excitation by a starter loop. Furthermore, the device has a detector loop for detecting a motion parameter and an analyzer loop for generating an output voltage proportional to the rotational speed. An external scaling factor defined as the ratio of the output voltage generated to the rotational speed to be measured is subject to changes over time, because the sensitivity of the sensor can change with temperature or with increasing age.

SUMMARY OF THE INVENTION

The device according to the present invention has the advantage over the related art that the temperature response or the aging process of the sensor with regard to the sensor output signal which is measured for a certain physical motion parameter is compensated.

No complicated sensitivity adjustment at the end of the band (e.g., an adjustment taking place after the manufacturing process) is necessary, which would require, for example, plotting a physical measured quantity against the temperature, then measuring the output signal and adjusting the desired sensitivity over the temperature, where this adjustment would have to take place, e.g., by storing coefficients of $n^{th}$ order polynomials, which are stored in EEPROMs, for example, or by Zener zapping, thyristor zapping or by potentiometer settings (saving chip area).

Furthermore, the availability of the sensor and its operating reliability are increased.

This is accomplished easily by supplying to a calibration circuit a sensor parameter which correlates with an internal scaling factor which reflects the temperature response and aging, etc.

This sensing parameter can be obtained from the existing starter loop in a suitable manner.

An especially simple embodiment is obtained when a starter circuit which is part of the starter loop supplies a constant starter voltage. The signal with which the starter circuit is controlled in the starter loop thus becomes a usable sensor parameter.

The calibration circuit can be implemented in an advantageous manner with conventional circuit parts, e.g., with a divider.

If an output compensating stage is also provided directly upstream from the signal output of the device, the device can be easily adjusted absolutely at the band end (e.g., the adjustment taking place after the manufacturing process) during manufacturing. For example, an absolute calibration is possible by a simple resistance compensation with the device according to the present invention.

The device can be used to advantage especially with rotational speed sensors, by setting the sensor in a state of constant vibration and the electric reference signal serving as a measure of the measured rotational speed.

BRIEF DESCRIPTION OF THE DRAWING

The FIGURE shows a device which is designed as a rotational speed sensor for determining a motion parameter with automatic sensitivity correction.

DETAILED DESCRIPTION

Figure 1:
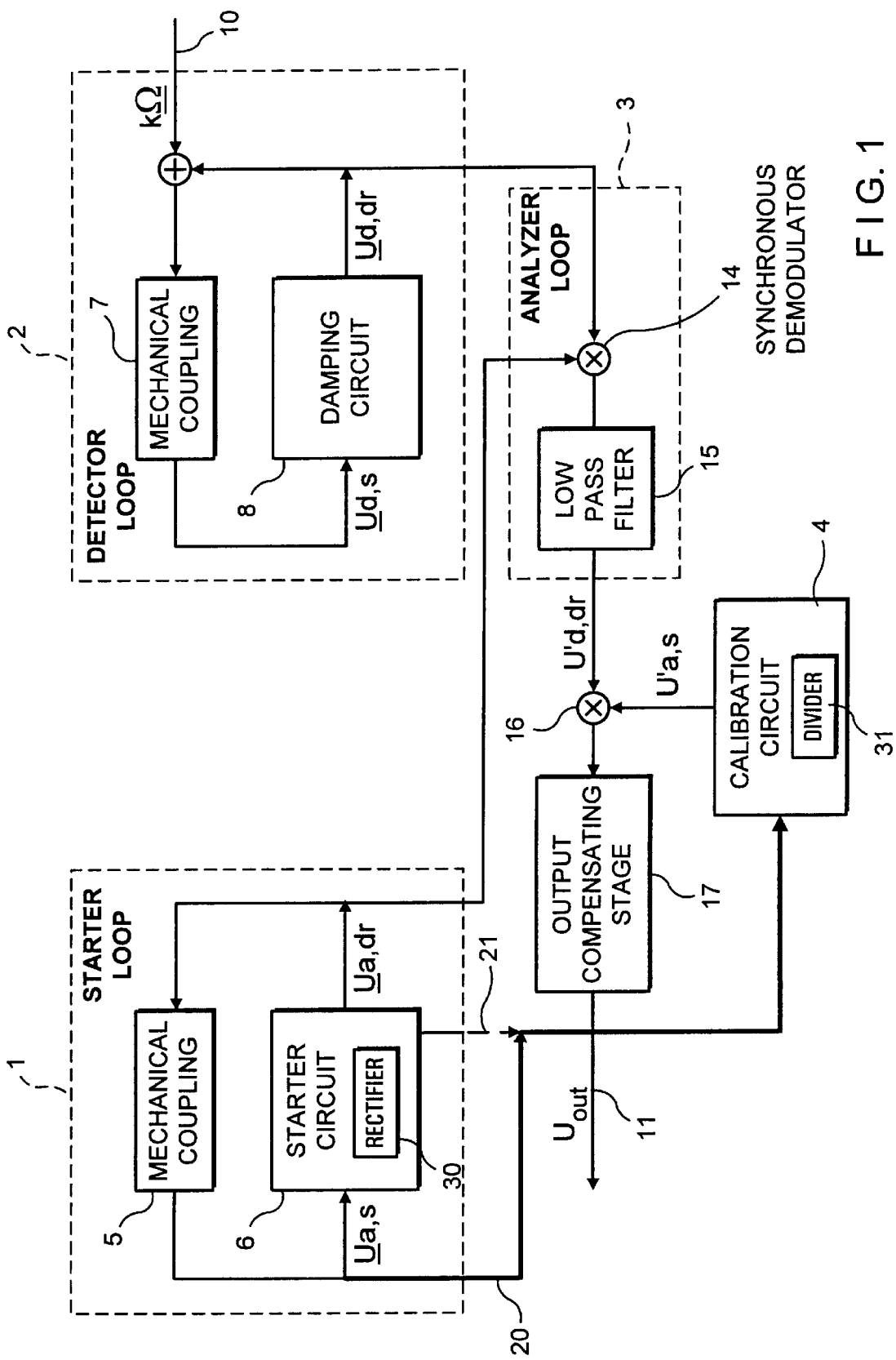

The device shown in the FIGURE has a starter loop 1, a detector loop 2 and an analyzer loop 3. The design and operation of these three parts are described, for example, in German Patent No. DE 44 47 005. The design and operation of these parts are also diagramed schematically in the FIGURE.

Starter loop 1 has a starter circuit 6 which interacts with the sensor. This interaction is represented as mechanical coupling 5 of the starter loop. Starter circuit 6 supplies a starter voltage with a constant amplitude $\underline{U}_{a,dr}$. This starter voltage controls piezoelectric elements which are attached to the sensor, so the sensor is set in constant vibration. Other sensor elements which are designed as piezoelectric elements, sense the vibration of the sensor. The starter sensor voltage with the amplitude $\underline{U}_{a,s}$ is a measure of this vibration. The starter sensor voltage is supplied to starter circuit 6 and serves to drive the starter circuit in correct phase sequence (positive feedback). The mechanical coupling 5 of the sensor to the piezoelectric elements is characterized by starter transfer function $\underline{F}_{a,m}$, and the function of starter circuit 6 is characterized by starter function $\underline{F}_a$.

Detector loop 2 has a damping circuit 8 which damps vibration of the rotational speed sensor produced by the Coriolis effect in rotational movement using a damping voltage with amplitude $\underline{U}_{d,dr}$. The FIGURE shows schematically input signal 10 which represents the electric equivalent of the rotational speed to be measured. In the schematic diagram, this signal is supplied to the sensor over a summation point. Additional piezoelectric elements are provided, recording the additional movement of the sensor induced by the rotational speed applied and the constant starter vibration due to the Coriolis effect. Mechanical coupling 7 of the detector loop has an analysis transfer function $\underline{F}_{d,m}$. The additional piezoelectric elements mentioned above supply a damping sensor voltage signal $\underline{U}_{d,s}$ which serves to drive damping circuit 8, characterized by damping function $\underline{F}_d$. In contrast to starter circuit 6 of starter loop 1, damping circuit 8 of detector loop 2 is wired for negative feedback. Thus, this is a master controller. The amplitude of damping voltage $\underline{U}_{d,dr}$ serves as a measure of the measured rotational speed.

In analysis circuit 3, which has a synchronous demodulator 14 and a low-pass filter 15 damping sensor voltage signal, $\underline{U}_{d,dr}$ is demodulated as starter voltage $\underline{U}_{a,dr}$ is processed. The resulting frequencies doubled in demodulation are filtered out in low-pass filter 15, so that a raw signal $\underline{U}'_{d,dr}$ which is proportional to the rotational movement to be measured is applied at the output of analyzer circuit 3. In a multiplier 16, this raw signal is multiplied by a correction signal $\underline{U}'_{a,s}$ of a calibration circuit 4 and adjusted in an output compensating stage 17 via an output compensation $F_{out}$, e.g., during manufacturing at the band end. Ultimately, sensor output signal 11 can be obtained from this output compensating stage 17. Calibration circuit 4, preferably in the form of a divider 31, is driven by a calibration branch 20 which supplies starter sensor voltage $\underline{U}_{a,s}$ to calibration circuit 4. Optionally, an alternative calibration branch 21 may be provided, which derives a suitable signal from starter circuit 6. Starter circuit 6 comprises a conventional combination of operational amplifiers and optional full-wave rectifiers 30 from which a control voltage which is already inversely proportional to the starter sensor voltage can be derived at a suitable point, so that calibration circuit 4 is greatly simplified and no longer needs a divider 31. The signal applied at alternative calibration branch 21 may be sent practically directly to multiplier 16.

It is essential for the operation of the calibration circuit of the device according to the present invention that it has a starter loop 1 that is separate from a detector loop 2. The internal scaling factor (defined as the ratio of the raw signal $\underline{U}'_{d,dr}$ to the rotational speed $\Omega$ to be measured) is subject to age-related changes as well as temperature-induced changes or other changes over time. The device according to the present invention causes the external scaling factor (i.e., the ratio of sensor output signal $\underline{U}_{out}$ (reference number 11) to the rotational speed $\Omega$ measured) to be independent of temperature fluctuations or age phenomena or other environmental influences. The automatic correction of the sensor sensitivity which is provided for this purpose as a function of an electric parameter determined by the internal scaling factor of the sensor takes place through calibration circuit 4. The starter loop is designed so that it operates at the resonant frequency of the sensor and excites the sensor to vibration at a constant amplitude $\underline{U}_{a,dr}$. In the embodiment described above, the detector loop operates in resonance with the frequency of the starter loop. However, embodiments where the detector loop 2 does not operate in resonance are also possible. In the latter case, a distinction can be made between use of only one sensor or use of a separate sensor for analysis of the motion parameters.

In the detector loop, a signal $\underline{U}_{d,dr}$ that is in phase opposition is generated, corresponding to the physical input parameter (rotational speed $\Omega$) except for the finite computing accuracy (loop gain). The following relationships hold (see the list of symbols following the description of the embodiment):

$$\underline{U}_{d,dr} = \underline{F}_{d,m} \times \underline{F}_d / (1 - \underline{F}_{d,m} \times \underline{F}_d) \times K\Omega \approx -K\Omega$$

(for $\underline{F}_{d,m} \times \underline{F}_d \gg 1; \mathrm{arc}(\underline{F}_{d,m}) + \mathrm{arc}(\underline{F}_d) \cong -180°$)

where $\underline{U}_{d,dr}$ is the damping sensor voltage signal, $\underline{F}_{d,m}$ is the analysis transfer function of mechanical coupling 7 of detector loop 2, $\underline{F}_d$ is the damping function of damping circuit 8, and $\Omega$ is the rotational speed.

It should be pointed out that a closed loop arrangement, such as that described here above, does not represent a prerequisite for achieving the object according to the present invention as long as it holds that $\underline{F}_{a,m} = \underline{F}_{d,m}$. In this case, what has been stated also applies to an open loop arrangement.

The characteristic of the measured value sensor, i.e., the starter transfer function $\underline{F}_{a,m}$, of the starter loop also enters into the internal scaling factor, i.e.

$$K = f(\underline{F}_{a,m}; \underline{U}_{a,dr}) = k_0 \times \underline{F}_{a,m} \times \underline{U}_{a,dr}.$$

Starter sensor voltage $\underline{U}_{a,s}$ is also dependent on $\underline{F}_{a,m}$ i.e., it holds that:

$$\underline{U}_{a,s} = \underline{F}_{a,m} \times \underline{U}_{a,dr}.$$

$\underline{U}_{a,s}$ is thus a measure of the internal scaling factor. Since it is ensured in the starter loop that $$\mathrm{arc}(\underline{F}_{a,m}) + \mathrm{arc}(\underline{F}_a) = 0° \text{ (vibration condition),}$$

then it is also possible to write:

$$U_{a,s} = F_{a,m} \times U_{a,dr}.$$

Then if $\underline{U}_{a,s}$ is processed in calibration circuit 4 in a form so that:

$$U'_{a,s} = k_{10} \times 1/(F_{a,m} \times U_{a,dr}),$$

(where this is already a d.c. voltage), then it follows that:

$$U'_{d,dr} = k_{20} \times U_{d,dr}$$
$$U_{out} = F_{out} \times U'_{a,s} \times U'_{d,dr}$$
$$= -F_{out} \times k_{10} \times k_{20} \times k_0 \times \Omega \neq f(\underline{F}_{a,m}; \underline{U}_{a,dr}).$$

Calibration circuit 4 may also be implemented by a rectification of $\underline{U}_{a,s}$ in addition to synchronous demodulation. $K_{10}$ denotes a constant factor assigned to calibration circuit 4. In any case, the reciprocal of $\underline{U}_{a,s}$ must be formed.

Starter circuit 6 is designed in this embodiment so that it has an AFC part (AFC=automatic frequency control) which regulates the phase angle of starter voltage $\underline{U}_{a,dr}$ required for positive feedback. Furthermore, starter circuit 6 also has an AGC part (AGC=automatic gain control) which ensures a constant amplitude of the starter voltage. Starter loop 1 is thus a self-exciting circuit part, so it has no oscillator. The starter voltage with a constant amplitude ($\underline{U}_{d,dr}$) is established with a frequency which corresponds to the resonant frequency of the sensor, i.e., it is in the kilohertz range, for example. The AGC circuit part can be implemented in such a way that an internal control voltage which is needed for maintaining a constant amplitude of starter voltage $\underline{U}_{a,dr}$ is already inversely proportional to starter sensor voltage $\underline{U}_{a,s}$. This eliminates the need for a divider in calibration circuit 4, as mentioned initially. In this case, only a constant gain factor needs to be implemented in calibration circuit 4. This alternative design of calibration circuit 4 is indicated schematically in the FIGURE by alternative calibration branch 21 which replaces calibration branch 20.

List of symbols:
$\Omega$ = rotational speed
K = internal scaling factor
$\underline{F}_{a,m}$ = starter transfer function
$\underline{F}_a$ = starter function
$\underline{U}_{a,s}$ = amplitude of the starter sensor voltage
$\underline{U}_{a,dr}$ = constant amplitude of the starter voltage
$\underline{F}_{d,m}$ = analysis transfer function
$\underline{F}_d$ = damping function
$\underline{U}_{d,s}$ = amplitude of the damping sensor voltage
$\underline{U}_{d,dr}$ = amplitude of the damping voltage
$k_{20}$ = gain factor (analysis circuit 3)
$U'_{d,dr}$ = raw signal
$U'_{a,s}$ = correction signal
$k_{10}$ = gain factor (calibration circuit 4)
$F_{out}$ = output correction
$U_{out}$ = sensor output signal
$k_0$ = constant

What is claimed is:

1. A device for determining a motion parameter with a sensor having a plurality of sensor elements coupled to one another, the motion parameter corresponding to a rotational speed, the device comprising:

a starter loop for putting the sensor in a state of excitation via a starter signal via at least one of the sensor elements and for generating a sensor quantity, the sensor quantity being a measure of a response of the sensor to the starter signal, wherein an amplitude of the starter signal is substantially constant;

a detector loop coupled to at least one of the sensor elements for providing a measurement signal correlating with the motion parameter;

an analysis unit for providing an output voltage representing the motion parameter as a function of the measurement signal;

a correction unit for keeping a substantially constant correlation between the output voltage and the motion parameter and for generating a correction signal as a function of the sensor quantity; and a multiplier providing the correction signal to the analysis unit.

2. The device according to claim 1, wherein the correction unit includes a calibration circuit for receiving the sensor quantity over a calibration branch.

3. The device according to claim 1, wherein the starter loop includes a phase-regulated starter circuit for supplying the starter signal, and the sensor quantity is an input voltage which is received by the phase-regulated starter circuit.

4. The device according to claim 1, wherein the correction unit includes a calibration circuit which has a synchronous demodulator or an arrangement of a divider connected to a rectifier of the starter loop.

5. The device according to claim 1, wherein the multiplier multiplies the correction signal by the output voltage.

6. The device according to claim 1, further comprising an output compensating stage for electrically adjusting a maximum value of the output voltage.

7. The device according to claim 1, wherein the excitation state is a vibration.

8. The device according to claim 1, wherein the analysis unit provides the output voltage as a function of only the measurement signal.

9. The device according to claim 1, wherein the sensor quantity is varied as a function of time, and wherein the sensor quantity relates to one of a temperature variation of the sensor and an aging influence of the sensor.

\* \* \* \* \*